United States Patent [19]

Haug

[11] 4,348,511

[45] Sep. 7, 1982

[54] PROCESS FOR THE PREPARATION OF CROSSLINKED, UNSATURATED POLYMERS AND THE POLYMERS THUS OBTAINED

[75] Inventor: Theobald Haug, Frenkendorf, Switzerland

[73] Assignee: Ciba-Geigy Corporation, Ardsley, N.Y.

[21] Appl. No.: 259,322

[22] Filed: Apr. 30, 1981

[30] Foreign Application Priority Data

May 7, 1980 [CH] Switzerland ................. 3554/80

[51] Int. Cl.$^3$ ............................................. C08G 18/34
[52] U.S. Cl. ........................................ 528/72; 528/73; 528/74; 528/75
[58] Field of Search ................... 528/72, 73, 74, 75

[56] References Cited

U.S. PATENT DOCUMENTS 3,925,268 12/1975 Rosemund et al. ................ 528/75
4,089,845 5/1978 Haug et al. ....................... 260/37 N

FOREIGN PATENT DOCUMENTS 2633294 1/1978 Fed. Rep. of Germany.

OTHER PUBLICATIONS

R. Kubens et al., Kunststoffe, 69, 455 (1979).
Liebigs Ann, 213, 171 (1882).
J. Tafel, Ber. 20, 244 (1887).
J. Prakt Chem., 78, 497 (1908).
E. Benary, Ber., 60, 1826 (1927).

*Primary Examiner*—Maurice J. Welsh
*Attorney, Agent, or Firm*—Luther A. R. Hall

[57] ABSTRACT

Novel crosslinked unsaturated polymers, which have better properties than conventional crosslinked unsaturated polymers are obtained by reacting a $\beta$-aminocrotonic acid ester, $\beta$-aminocrotononitrile or $\beta$-aminocrotonamide with a diisocyanate or polyisocyanate and a polyol, for example at temperatures of between 50° and 180° C.

14 Claims, No Drawings

PROCESS FOR THE PREPARATION OF CROSSLINKED, UNSATURATED POLYMERS AND THE POLYMERS THUS OBTAINED

The present invention relates to a process for the preparation of crosslinked, unsaturated polymers based on isocyanates, polyols and β-aminocrotonic acid derivatives, and to the polymers prepared by this process.

German Offenlegungsschrift No. 2,633,294 describes crosslinked, unsaturated block polyamides. Materials of construction prepared from these exhibit improved dimensional stability, and higher solvent resistance, compared to corresponding non-crosslinked polymers.

These block polyamides are prepared by crosslinking, by means of a polyisocyanate, a polymer having enamine structures in the polymer chain, such a polymer being obtained by polycondensation of a bis-acetoacetamide with a dihydrazide compound. The unsaturated polymers used as starting materials have molecular weights of between 5,000 and 40,000. Accordingly, they are viscous substances, and this viscosity causes difficulties when the substances are processed and mixed with reactants. Accordingly, the reaction with the polyisocyanate is effected either in a kneader or in solution.

It is not possible to prepare mouldings, by casting methods, in accordance with the teaching of German Offenlegungsschrift No. 2,633,294.

A conspicuous feature of the said known process is that in the main the reaction is carried out with a less than equivalent amount of polyisocyanate. An increase in the amount of polyisocyanate, such as is often employed in conventional polyurethane technology in order to improve the technical properties of the end products, evidently does not prove successful in this instance.

Polymers based on isocyanate/polyol are described, for example, by R. Kubens et al. in Kunststoffe 69, (1979) 455–461. Polyurethanes which contain an aromatic isocyanate as the isocyanate component are distinguished by good heat distortion resistance and good mechanical properties. Since, however, urethane formation takes place extremely rapidly, the mass gels prematurely, and this in turn leads to an unfavourably short pot life. Polyurethanes with an aliphatic isocyanate component permit a longer pot life, but have a lower heat distortion resistance.

It is the object of the invention to provide a process for the preparation of crosslinked, unsaturated polymers, based on isocyanates and polyols, in which, though the crosslinking is effected by polyisocyanates, the process is carried out under more advantageous rheological conditions, so that even the casting method can be employed without difficulties. It is a further object of the invention to provide novel crosslinked unsaturated polymers which have better properties than those of the prior art polymers.

The invention accordingly relates to a process for the preparation of crosslinked unsaturated polymers, which comprises reacting a mixture, containing substantially stoichiometric amounts of a diisocyanate or polyisocyanate and of a polyol, with a monomeric or oligomeric β-aminocrotonic acid ester or β-aminocrotononitrile or β-aminocrotonamide, the ratio of the isocyanate component to the β-aminocrotonic acid derivative component being chosen so as to provide not less than one isocyanate group per molecular group of the formula

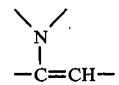

of the particular β-aminocrotonic acid derivative.

In a preferred embodiment, 1 to 2 isocyanate groups are provided per molecular group of the formula

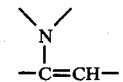

of the particular β-aminocrotonic acid derivative.

The reaction can be carried out at temperatures of 20° C. to 200° C., preferably of 50° to 180° C.

Preferred β-aminocrotonic acid esters are those of the formula I to III:

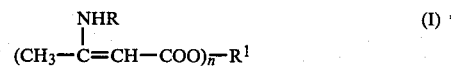

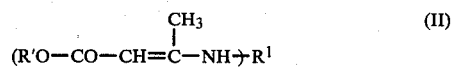

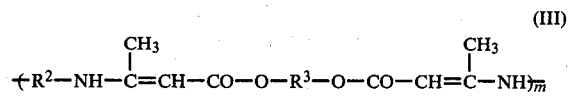

in which R is a hydrogen atom or a saturated or unsaturated linear, branched or cyclic hydrocarbon radical having 1 to 9 C atoms, R' is a saturated or unsaturated, linear, branched or cyclic hydrocarbon radical having 1 to 9 carbon atoms, n is one of the numbers 2, 3 or 4 and m is a number from 4 to 15 and $R^1$ is an n-valent, and $R^2$ and $R^3$ are each a divalent, linear, branched or cyclic hydrocarbon radical which can contain ether bridges or COO groups and has 2 to 20 C atoms, or a divalent heterocyclic ring containing N, O or S atoms, $R^2$ and $R^3$ being identical or different.

R can be $C_1$-$C_9$-alkyl, for example methyl, isopropyl, n-butyl, 2-ethylhexyl or n-nonyl, or $C_3$-$C_9$-alkenyl, for example allyl, methally or oct-1-en-2-yl; as a cyclic hydrocarbon radical, R can be, for example, phenyl.

Preferably, R is hydrogen or $C_1$-$C_4$-alkyl, hydrogen being especially preferred.

A divalent radical $R^1$ can be a divalent alkyl radical having 2 to 20 C atoms, for example ethylene, tetramethylene, hexamethylene, 2,2-dimethylpropylene, —CH$_2$C(CH$_3$)$_2$—CH$_2$—OOC—C(CH$_3$)$_2$—CH$_2$—, —CH$_2$CH$_2$—O—CH$_2$CH$_2$— or —CH$_2$CH$_2$—O—$_2$CH$_2$CH$_2$—, or a cyclic hydrocarbon radical, for example, 1,4-cyclohexylene, 1,4-phenylene, p-xylylene or the group

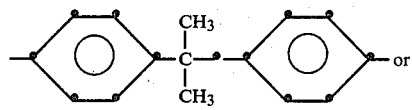 or

-continued

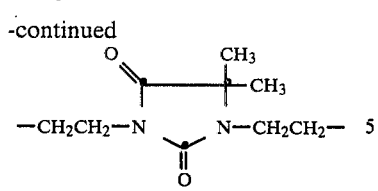

A trivalent radical $R^1$ can be, for example, the group

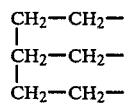

whilst a tetravalent radical can be, for example,

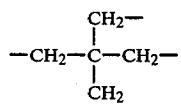

A preferred meaning of $R^1$ is a divalent aliphatic radical which can contain ether bridges or COO groups, especially hexamethylene or 2,2-dimethylpropylene.

R' can be $C_1$–$C_9$-alkyl, for example methyl, isopropyl, n-butyl, 2-ethylhexyl, or nonyl, or $C_3$–$C_9$-alkenyl, for example allyl, methallyl or oct-1-en-2-yl; as a cyclic hydrocarbon radical, R' can be, for example, phenyl. Preferred meanings of R' are $C_1$–$C_4$-alkyl and $C_2$–$C_4$-alkenyl, and particularly preferred meanings are methyl or allyl.

The use of β-aminocrotonic acid esters of the formula I is particularly preferred, especially of those esters in which n is 2 and $R^1$ is a divalent aliphatic radical which can contain ether bridges or COO groups, especially hexamethylene or 2,2-dimethylpropylene.

$R^2$ can be a divalent alkyl radical having 2-20 C atoms, for example ethylene, hexamethylene or 2,4,4-trimethylhexamethylene; as a cyclic hydrocarbon radical, $R^2$ can be, for example, o-, m- or p-phenylene, p-xylylene or the group

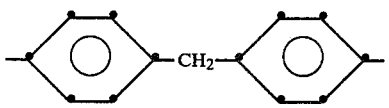

A preferred meaning of $R^2$ is a divalent alkyl radical having 2–9 atoms, in particular 2,4,4-trimethylhexamethylene.

$R^3$ can be a divalent alkyl radical having 2–20 C atoms, which can be interrupted by ether bridges, for example ethylene or hexamethylene or the group —CH$_2$CH$_2$—O—CH$_2$CH$_2$—; as a cyclic hydrocarbon radical, $R^3$ can be, for example, 1,4-cyclohexylene or the group

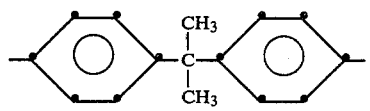

a preferred meaning of $R^3$ is a divalent alkyl radical having 2–9 C atoms, in particular tetramethylene.

Preferred β-aminocrotononitriles are those of the formulae IV to VI

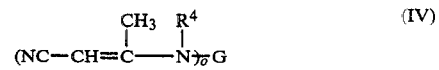

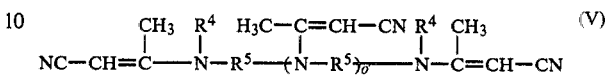

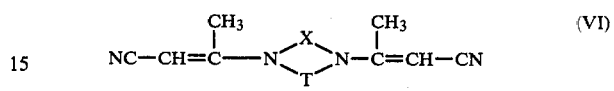

in which $R^4$ is a hydrogen atom, alkyl having 1 to 6 C atoms, cycloalkyl having 5 or 6 C atoms or aryl having 6 to 10 C atoms, o' is one of the numbers 1, 2 or 3, o is one of the numbers 2 or 3, G is an o-valent organic radical having 2 to 30 C atoms and $R^5$ is a divalent aromatic or aliphatic radical having up to 30 C atoms, and X and T are organic radicals which, together with the two N atoms, form a 5-membered or 6-membered heterocyclic ring.

A $C_1$–$C_6$-alkyl radical $R^4$ can be, for example, methyl, ethyl, isopropyl, n-butyl or n-hexyl.

A cycloalkyl radical $R^4$ can be, for example, cyclopentyl or cyclohexyl.

An aryl radical $R^4$ can be, for example, phenyl.

The preferred meaning of $R^4$ is hydrogen.

G can be a divalent radical which is, for example, a branched or straight-chain aliphatic radical which can be interrupted by O or S bridges and can be substituted by $C_1$–$C_4$-alkoxy. G can also be $C_5$–$C_8$-cycloalkylene or the group

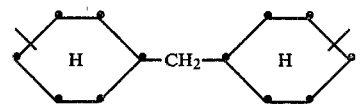

in which the rings can be substituted by $C_1$–$C_4$-alkyl; a preferred meaning is 1,4-cyclohexylene. An aromatic radical G can be $C_6$–$C_{10}$-arylene, such as 1,3- or 1,4-phenylene or 1,5-naphthylene, or a bicyclic radical of the formula

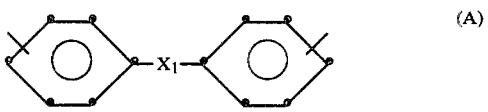

in which $X_1$ is —O—, —CH$_2$—, —SO$_2$—,

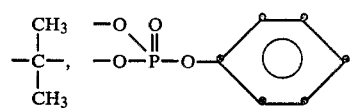

or —COO—(CH$_2$)$_{2\text{-}6}$—OOC— and in which the phenyl rings can each be substituted by one chlorine. G can also be an aromatic-aliphatic radical, such as m- or p-xylylene. Further, G can be a divalent 5-membered or 6-membered N-heterocyclic radical, which can be benzo-fused and/or can be N-substituted by $C_1$–$C_4$-alkyl or phenyl.

Preferred meanings of a divalent radical G are an aliphatic, an aromatic or an aromatic-aliphatic radical, especially hexamethylene or

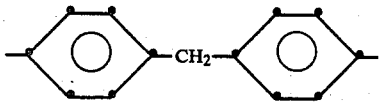

G can also be a trivalent radical, namely a $C_2$–$C_{30}$ aliphatic radical which can be interrupted by O bridges, or a mononuclear or polynuclear aryl radical, such as benzenetriyl or naphthalenetriyl, or a bicyclic aryl radical of the formula B

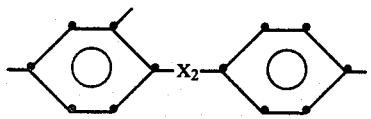 (B)

in which $X_2$ is —O—, —CH$_2$—, —SO$_2$—,

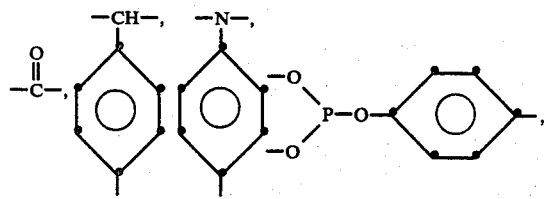

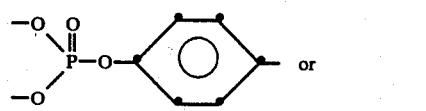 or

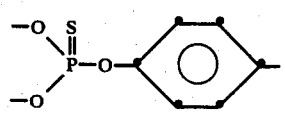

and the phenyl rings can each be substituted by a $C_1$–$C_4$-alkyl group, or a 5-membered or 6-membered N-heterocyclic radical.

A preferred meaning of a trivalent radical G is an aromatic radical, especially a monocyclic radical.

A divalent aliphatic radical $R^5$, having 2–30 C atoms, can be, for example, ethylene, trimethylene or tetramethylene. A preferred meaning is a divalent alkyl radical having 2–6 C atoms.

An aromatic radical $R^5$ can be, for example p-phenylene.

X and T, together with the two N atoms, can form, for example, a piperazine, hexahydropyrimidine or imidazolidine ring, of which the first-mentioned is preferred.

Particularly preferred β-aminocrotononitriles of the formula IV are those in which n is the number 2 and G is a divalent aliphatic, aromatic or aromatic-aliphatic radical, in particular hexamethylene or

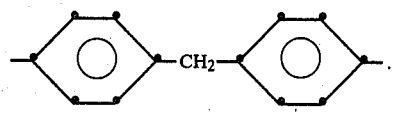

Preferred β-aminocrotonamides are those of the formulae VII to XI

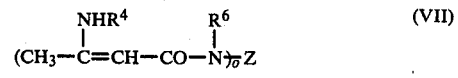 (VII)

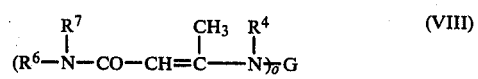 (VIII)

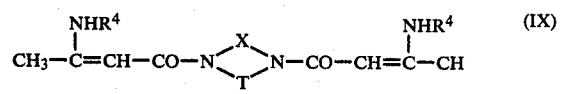 (IX)

in which $R^4$, $R^6$ and $R^7$, independently of one another, are hydrogen, alkyl having 1 to 6 C atoms, cycloalkyl having 5 or 6 C atoms or aryl having 6 to 10 C atoms, o is 2 or 3 and G and Z, independently of one another, are an o-valent organic radical having 2 to 30 C atoms, and X and T are organic radicals which, together with the two N atoms, form a 5-membered or 6-membered heterocyclic ring.

Examples and preferred meanings of G, $R^4$, X and T have already been given for formulae IV and VI. Z can have the same meanings as G. A preferred meaning of Z is a divalent aliphatic radical, especially 2,2,5-trimethyl-hexamethylene.

$R^6$ and $R^7$ can have the same meanings as $R^4$. Preferably, $R^4$ and $R^6$ are hydrogen and $R^7$ is $C_1$–$C_4$-alkyl.

Particularly preferred β-aminocrotonamides of the formula VII are those in which $R^4$ and $R^6$ are each hydrogen, o is the number 2 and Z is a divalent aliphatic radical, especially 2,2,5-trimethyl-hexamethylene.

In principle, any diisocyanate and polyisocyanate conventionally employed in present-day polyurethane technology can be used according to the invention. Accordingly, these can be aliphatic, cycloaliphatic and aromatic compounds, for example diisocyanates of divalent alkyl radicals having 4–9 C atoms, such as tetramethylene diisocyanate and hexamethylene diisocyanate, isomer mixtures of 2,2,4- and 2,4,4-trimethylhexamethylene diisocyanate, trimerised hexamethylene diisocyanate, 3-isocyanatomethyl-3,5,5-trimethyl-cyclohexyl isocyanate ("isophorone diisocyanate"), arylene diisocyanates, which can be substituted by $C_1$–$C_4$-alkyl, such as m- and p-phenylene diisocyanate, naphthylene diisocyanates, diphenylmethane, 4,4'-diisocyanate, methylphenylene diisocyanates, such as 2,4- and 2,6-methylphenylene diisocyanate and mixtures of these, di- and tri-isopropylbenzene diisocyanates and triphenylmethane triisocyanates, tri-(p-isocyanatophenyl)-thiophosphate, tri-(p-isocyanatophenyl)-phosphate, aralkyl diisocyanates, such as 1-(isocyanatophenyl)-ethyl isocyanate or m- and p-xylylene diisocyanate, as well as polyisocyanates of the above types which are substituted by various groups, for example by $C_1$–$C_4$-alkoxy, phenoxy (in which the phenyl can be $C_1$–$C_4$-alkyl-substituted), NO$_2$ or Cl, and polyphenyl-polymethylene polyisocyanate obtained by an aniline-formaldehyde condensation, followed by phosgenation, as well as the reaction products of the above isocyanates with a less than equivalent amount of polyhydroxy compounds, for example trimethylolpropane, hexanetriol, glycerol and butanediol, or with water. Further examples are polyisocyanates blocked with phenols or with bisulfite, and polymerised isocyanates having an isocyanurate ring structure. Preferred compounds are hexamethylene diisocyanate, diphenylmethane 4,4'-diisocyanate and toluylene diisocyanate.

The polyols used can be any polyhydroxy compounds, of high OH content, conventionally employed in polyurethane technology.

Aliphatic polyols, for example polyether-polyols having an OH equivalent weight of 90 to 250, are preferred.

Branched aliphatic polyether-polyols having a hydroxyl equivalent weight of 105 or 150 are especially preferred.

Examples of suitable polyols are polyoxypropylene glycol, polyoxypropylene/glycerol adducts, polyoxypropylene/trimethylolpropane adducts, polyoxypropylene-oxyethylene/trimethylolpropane block adducts, polyoxypropylene/1,2,6-hexanetriol adducts, polyoxypropylene/pentaerythritol adducts and polyoxypropylene/sorbitol adducts, the average molecular weight of the polyols being preferably 500–5000.

The β-aminocrotonic acid esters of the formulae I to III are a well-known category of compounds and can be prepared as described in Liebigs Annalen, volume 213, page 171 (1882) or in Berichten der Deutschen Chemischen Gesellschaft, volume 20 (1887), page 247. In these methods, the corresponding β-ketocarboxylic acid ester is reacted with ammonia or a monoamine in order to prepare a compound of the formula I, with a diamine, triamine or tetramine to prepare a compound of the formula II, or with a diamine to prepare a compound of the formula III. The β-aminocrotonic acid esters of the formula I and II have also ready been described in detail in U.S. Pat. No. 4,089,845.

Examples of compounds of the formula I are 1,2-ethylene glycol bis-(β-aminocrotonate), 2,2-dimethyl-1,3-propylene glycol bis-(β-aminocrotonate), 1,4-tetramethylene glycol bis-(β-aminocrotonate), 1,6-hexamethylene glycol bis-(β-aminocrotonate), α,ω-diethylene glycol bis-(β-aminocrotonate), α, ω-triethylene glycol bis-(β-aminocrotonate), 1,4-cyclohexanediol bis-(β-aminocrotonate), hydroquinone bis-(β-aminocrotonate), 2,2-bis-(4-hydroxyphenyl)-propane bis-(β-aminocrotonate), α,α'-dihydroxy-p-xylylene bis-(β-aminocrotonate), bis-(β-hydroxyethyl)-5,5-dimethylhydantoin bis-(β-aminocrotonate), 1,2-ethylene glycol bis-(β-methylaminocrotonate), 1,4-tetramethylene glycol bis-(β-butylaminocrotonate), 2,2-bis-(4-hydroxyphenyl)-propane bis-(β-anilinocrotonate), trimethylolpropane tris-(β-aminocrotonate) and pentaerythrityl tetra-(β-aminocrotonate).

Examples of compounds of the formula II are N,N'-ethylene-bis-(ethyl β-aminocrotonate), N,N'-tetramethylene-bis-(ethyl β-aminocrotonate), N,N'-(2,4,4-trimethyl)-hexamethylene-bis-(methyl β-aminocrotonate), N,N'-p-phenylene-bis-(methyl β-aminocrotonate), N,N'-4,4'-diphenylenemethane-bis-(methyl β-aminocrotonate), N,N'-m-xylylene-bis-(phenyl β-aminocrotonate), N,N'-[bis-(methyl β-aminocrotonate)]-1,3-di-(γ-aminopropyl)-5,5-dimethylhydantoin and N,N'-4,4'-di-cyclohexylmethane-bis-(ethyl β-aminocrotonate).

The β-aminocrotonic acid esters of the formula III can be prepared from bis-acetoacetic acid esters, for example 1,2-ethylene glycol bis-acetoacetate, 1,6-hexamethylene glycol bis-acetoacetate, α,ω-diethylene glycol bis-acetoacetate, 1,4-cyclohexanediol bis-acetoacetate or 2,2-bis-(4-hydroxyphenyl)-propane bis-acetoacetate and diamines, for example ethylenediamine, hexamethylenediamine, 2,4,4-trimethylhexamethylenediamine, p-, m- or o-phenylenediamine, 4,4'-diaminodiphenylmethane or p-xylylenediamine. The substances of the formula III can be prepared either from one bis-acetoacetic ester and one diamine, or from mixtures of the components.

The β-aminocrotonitriles of the formulae IV to VI are also known compounds and can be prepared, for example, by the methods described in Journal für praktische Chemie, volume 78 (1908), page 497 or in Berichte der Deutschen Chemischen Gesellschaft, volume 60 (1927), page 1826, by reacting the unsubstituted β-aminocrotononitrile with a diamine or polyamine of one of the formulae IVa to VIa

 (IVa)

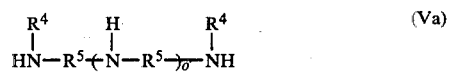 (Va)

 (VIa)

in which G, R⁴, R⁵, o, o', X and T are as defined for formulae IV to VI, with elimination of ammonia.

Examples of diamines of the formula IVa are ethylenediamine, tetramethylenediamine, hexamethylenediamine, 2,4,4-trimethylhexamethylenediamine, octamethylenediamine, decamethylenediamine, dodecamethylenediamine, 2,2-dimethyl-1,3-diaminopropane, 2,5-dimethyl-1,5-diaminoheptane, 2,5-dimethyl-1,6-diamino-hexane, 2,5-dimethyl-1,7-diaminoheptane, 3,3,5-trimethyl-1,6-diaminohexane, 1,2-bis-(3-aminopropoxy)-ethane, 3-methoxy-1,6-diaminohexane, NH₂(CH₂)₃O(CH₂)₃NH₂, H₂N—C₂H₄—S—C₂H₄—NH₂, 4,4'-diaminodicyclohexylmethane, 1,4-diaminocyclohexane, m-phenylenediamine, p-phenylenediamine, 1,4-diaminodiphenylmethane, 3,3'-dichloro-4,4'-diaminodiphenylmethane, bis-(4-aminophenyl)-2,2-propane, 4,4'-diaminodiphenyl ether, 4,4'-diaminodiphenylsulfone, 1,5-diaminonaphthalene, m-xylylenediamine, p-xylylenediamine, 1,3-bis-(γ-aminopropyl)-5,5-dimethylhydantoin, 4,4'-diaminotriphenyl phosphate, 3-aminomethyl-3,5,5-trimethylcyclohexylamine (isophoronediamine), 4,4'-methylene-bis-(2-methylcyclphexylamine), 4-amino-3-aminomethylpiperidine, 3-amino-4-aminomethylpyrrolidines which are C₁–C₄-alkyl-substituted at the N atom, for example 1-methyl-3-amino-4-aminomethylpyrrolidine, phenylindolediamine, 2,5-di-(ω-aminoalkyl)-pyrazine, with 1-4 C atoms in the alkyl moiety, p-aminobenzoic acid diesters and anthranilic acid diesters of C₂–C₆-aliphatic diols, and di-secondary diamines, such as N,N'-di-(cyclohexyl)-hexamethylenediamine or N,N'-di-(cyclopentyl)-hexamethylenediamine.

Examples of trivalent amines of the formula IVa are 1,2,4-triaminobenzene, 1,3,5-triaminobenzene, 2,4,6-triaminotoluene, 2,4,6-triamino-1,3,5-trimethylbenzene, 1,3,7-triaminonaphthalene, 2,4,4'-triaminodiphenyl, 3,4,6-triaminopyridine, 2,4,4'-triaminophenyl ether, 2,4,4'-triaminodiphenylmethane, 2,4,4'-triaminodiphenylsulfone, 2,4,4'-triaminobenzophenone, 2,4,4'-triamino-3-methyldiphenylmethane, N,N,N-tri-(4-aminophenyl)-amine, tri-(4-aminophenyl)-methane, tri-(4-aminophenyl) phosphate, $O=P(O-CH_2-CH_2-NH_2)_3$,

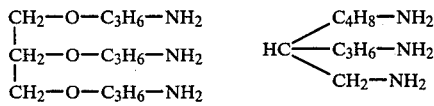

$CH_3-CH_2-C(CH_2-O-C_3H_6-NH_2)_3$ and 1,8-diamino-4-aminomethyl-octane

Examples of suitable aliphatic amines of the formula Va are the dialkylenetriamines and trialkylenetetramines, preferably those having a divalent alkylene radical containing 2 to 6 carbon atoms, for example diethylenetriamine, triethylenetetramine, dipropylenetriamine, tripropylenetetramine or tritetramethylenetetramine. An example of a suitable aromatic amine is 4,4'-diaminodiphenylamine.

Examples of amines of the formula VIa are piperazine, hexahydropyrimidine and imidazolidine.

The β-aminocrotonamides of the formulae VII to IX also belong to a known category of compounds and can be prepared by the methods described in Liebigs Annalen, volume 213, page 171 (1882) or Berichte der Deutschen Chemischen Gesellschaft, volume 20, page 274 (1887). In these methods, the corresponding β-ketocarboxylic acid amide is reacted with ammonia or a monoamine to prepare a compound of the formula VII or IX, and with a diamine, triamine or tetramine to prepare a compound of the formula VIII.

Examples of compounds of the formula VII are N,N'-bis-(β-aminocrotonyl)-ethylenediamine, N,N'-bis-(β-aminocrotonyl)-hexamethylenediamine, N,N'-bis-(β-aminocrotonyl)-2,2,5-trimethylhexamethylenediamine, N,N'-bis-(β-aminocrotonyl)-dodecamethylenediamine, N,N'-bis-(β-aminocrotonyl)-m-phenylenediamine, N,N'-bis-(β-aminocrotonyl)-4,4'-diaminodiphenylmethane, N,N'-bis-(β-aminocrotonyl)-3,3'-dichloro-4,4'-diaminodiphenylmethane, N,N'-bis-(β-aminocrotonyl)-4,4'-diamino-3,3'-dimethyldicyclohexylmethane, N,N'-bis-β-aminocrotonyl)-1,4-diaminocyclohexane, N,N'-bis-(β-aminocrotonyl)-p-xylylenediamine, N,N'-bis-(β-aminocrotonyl)-1,3-di-(γ-aminopropyl)-5,5-dimethylhydantoin, N,N'-bis-(β-methylaminocrotonyl)-ethylenediamine, N,N'-bis-(β-anilinocrotonyl)-hexamethylenediamine, N,N'-bis-(β-butylaminocrotonyl)-4,4'-diaminodiphenylmethane, N,N'-bis-(β-butylaminocrotonyl)-4,4'-diamino-dicyclohexylmethane and N,N'-bis-(β-cyclohexylaminocrotonyl)-1,4-diaminocyclohexane.

Examples of compounds of the formula VIII are N,N'-ethylene-bis-(β-aminocrotonic acid methylamide), N,N'-hexamethylene-bis-(β-aminocrotonic acid n-butylamide), N,N'-(2,4,4-trimethyl)-hexamethylenebis-(β-aminocrotonic acid n-butylamide), N,N'-tetramethylene-bis-(β-aminocrotonic acid diethylamide), N,N'-p-phenylene-bis-(β-aminocrotonic acid anilide, N,N'-bis-(β-aminocrotonyl-4,4'-diaminodiphenylmethane, N,N'-bis-(β-aminocrotonyl)-N,N'-bis-cyclohexyl-3,3'-dimethyl-4,4'-diaminodicyclohexylmethane and N,N'-bis-(β-aminocrotonyl)-1,3-di-γ-aminopropylene-5,5-dimethylhydantoin.

Examples of compounds of the formula IX are N,N'-bis-(β-aminocrotonyl)-piperazine, N,N'-bis-(β-aminocrotonyl)-hexahydropyrimidine and N,N'-bis-(β-aminocrotonyl)-imidazolidine.

The process according to the invention is in general carried out by employing only one particular β-aminocrotonic acid derivative together with only one particular polyisocyanate and one particular polyol. It is however also possible, without disadvantage, to employ mixtures for each of the reactants. Thus, mixtures of different β-aminocrotonic acid esters or mixtures of different β-aminocrotonamides can be used. It is however also possible to employ mixed reactants consisting of esters and nitriles, or esters and amides, or nitriles and amides. Similar remarks apply to the polyisocyanates and to the polyols. It is also possible for one reactant to be a mixture and another to be a pure substance.

In contrast to the process disclosed in German Offenlegungsschrift No. 2,633,294, the process according to the present invention can very advantageously also be carried out as a casting process. However, carrying out the process in solution or in a kneader also presents no difficulties. The polymers according to the invention can be converted, by known techniques, to lacquers, binders, compression moulding compositions and shaped articles, such as laminates or products produced by injection moulding, by extrusion or by similar methods. A preferred used of the polymers according to the invention is for the production of shaped articles.

The novel polymers obtained by the process according to the invention have improved heat distortion resistance. Furthermore, their longer gel time substantially facilitates their processing relative to the prior art products having good heat distortion resistance.

Data of the Stating Materials Used in the Examples

Desmodur N 100 ® (from Bayer AG) is a trimerised hexamethylene diisocyanate, which is obtained by reacting hexamethylene diisocyanate with water in the molar ratio of 3:1, accompanied by elimination of $CO_2$, and has an isocyanate equivalent weight of about 160.

Baymidur K 88 ® (from Bayer AG) is diphenylmethane 4,4'-diisocyanate, having an isocyanate equivalent weight of 130 to 140.

Baygal K 30 ® (from Bayer AG) is a branched polyetherpolyol having a hydroxyl equivalent weight of 105.

Baygal K 55 ® (from Bayer AG) is a branched polyetherpolyol having a hydroxyl equivalent weight of 150.

Desmophen 550 U ® (from Bayer AG) is a polyol having a hydroxyl equivalent weight of 148.

Zeolith-L-Paste ® (from Bayer AG) is used as a drying agent.

Isophorone diisocyanate is 3-isocyanatomethyl-3,5,5-trimethylcyclohexyl isocyanate.

Toluylene diisocyanate is a mixture of about 80% of methylenephenylene 2,4-diisocyanate and about 20% of methylphenylene-2,6-diisocyanate.

The new polymers are tested by determining the flexural strength according to VSM 77 105 and the heat distortion resistance according to ISO/R 75. (VSM is the abbreviation for Verein Schweizerischer Maschinenindustrieller and ISO/R the abbreviation for International Standard Organisation/Recommendation).

Table 1 lists the β-aminocrotonic acid derivatives employed.

The Examples which follow illustrate the invention.
Determination of mechanical test data:

EXAMPLES 1-9

The polyol, the β-aminocrotonic acid derivative and the zeolith-K-Paste ® (2% by weight, based on the final mixture, are mixed at about 60° C. and the mixture is degassed in vacuo. The isocyanate is then added and the batch is again mixed at about 60° C. and degassed. Depending on the melting point of the β-aminocrotonic acid derivative, the bath temperature can be above 60° C., and temperatures of 80°–130° C. may be necessary. The melts obtained are poured into moulds of internal dimensions 140 mm×140 mm×4 mm. They are then heated in an oven, to convert them, by crosslinking, into bubble-free, hard mouldings. The following hardening cycle is employed:

For low-melting substances: 2 hours each at 60° C., 80° C., 100° C., 120° C. and 140° C.

For high-melting substances: 2 hours each at 100° C., 120° C. and 140° C.

COMPARATIVE EXAMPLES A–D

The polyol, the isocyanate and 2% by weight of Zeolith-L-Paste ® (based on total mixture) are mixed at room temperature and the mixture is degassed at not more than 50° C. It is then poured into moulds of internal dimensions 140 mm×140 mm×4 mm, and converted to more or less solid mouldings by stepwise heating.

The hardening cycle comprises 2 hours each at 60° C., 80° C., 100° C., 120° C. and 140° C.

TABLE 1

| Code | Structural formula of the β-aminocrotonic acid derivative | Corresponds to formula |
|---|---|---|
| $L^1$ | $[CH_3-\underset{NH_2}{C}=CH-COO-CH_2CH_2\!\!-]_2$ | I |
| $L^2$ | $[CH_3-\underset{NH_2}{C}=CH-COO-CH_2CH_2CH_2\!\!-]_2$ | I |
| $L^3$ | $[CH_3-\underset{NH_2}{C}=CH-COO-CH_2\!\!-]_2 C(CH_3)_2$ | I |
| $L^4$ | $[CH_3-\underset{NH_2}{C}=CH-COO-CH_2CH_2-O-CH_2\!\!-]_2$ | I |
| $L^5$ | $CH_3-\underset{NH_2}{C}=CH-COO-CH_2-\underset{CH_3}{\overset{CH_3}{C}}-CH_2-OOC-\underset{CH_3}{\overset{CH_3}{C}}-CH-OOC-CH\underset{\overset{|}{CH_3}}{\overset{\overset{|}{H_2N-C}}{\|\|}}$ | I |
| $L^6$ | $CH_3-\underset{NH_2}{C}=CH-CONH-CH_2-\underset{CH_3}{\overset{CH_3}{C}}-CH_2CH_2-\underset{CH_3}{CH}-CH_2-NHCO-CH=\underset{NH_2}{C}-CH_3$ | VII |

TABLE 2

| | | | | Mechanical test data | | | | |
|---|---|---|---|---|---|---|---|---|
| Example | Isocyanate | Polyol | L | Group ratio* NCO:OH:—N(C=CH)— | Flexural strength N/mm² | Impact strength KJ/m² | Heat distortion point °C. | Glass transition temperature °C. |
| A | Desmodur N 100 ® | Baygal K 30 ® | — | 1:1 | 83 | 52 | 55 | 53 |
| 1 | " | " | $L^2$ | 3.9:1.3:1.3 | 110 | 25 | 84 | 88 |
| 2 | " | " | $L^3$ | 3:1:1 | 125 | 33 | 90 | — |
| 3 | " | " | $L^5$ | 3.6:1.3:1.3 | 115 | 51 | 68 | 73 |
| B | Desmodur N 100 ® | Baygal K 55 ® | — | 1:1 | 30 | 97 | 42 | 36 |
| 4 | " | " | $L^6$ | 3.7:1.35:1.35 | 124 | 31 | 86 | 80 |
| 5 | " | " | $L^1$ | 3:1:1 | 106 | 80 | 67 | 75 |
| 6 | " | " | $L^1$ | 2:1:1 | 97 | 44 | 57 | 54 |
| C | Baymidur K 88 ® | Baygal K 55 ® | — | 1:1 | 110 | 40 | — | 90 |
| 7 | " | " | $L^5$ | 4.2:1.6:1.6 | 147 | 9 | 113 | 120 |
| 8 | " | " | $L^3$ | 3:1:1 | — | — | — | 132 |
| D | Isophorone diisocyanate | Baygal K 30 ® | — | 1:1 | — | — | — | 89 |
| 9 | " | " | $L^2$ | 3:1:1 | 47 | — | 94 | 106 |

*Equivalent ratio

Determination of the gel times:

EXAMPLES 10-12

To carry out the determination, mixtures are prepared as in Examples 1-9, and the gel times at 120° C. are measured.

COMPARATIVE EXAMPLES F-H

Mixtures are prepared analogously to Comparative Examples A-D, and the gel times are determined.

TABLE 3

Gel times

| Example | Isocyanate | Polyol | L | Group ratio NCO:HO:$-\overset{\underset{\displaystyle N}{|}}{C}=CH-$ | Gel time at 120° C. |
|---|---|---|---|---|---|
| F | Desmodur N 100 ® | Desmophen 550 U ® | — | 1:1 | 4' |
| 10 | " | " | $L^4$ | 2:1:1 | 10' |
| G | Toluylene diisocyanate | Baygal K 55 ® | — | 1:1 | 1'30" |
| 11 | " | " | $L^5$ | 2:1:1 | 5'30" |
| H | Isophorone diisocyanate | Baygal K 30 ® | — | 1:1 | 9'10" |
| 12 | " | " | $L^2$ | 3:1:1 | 42' |

What is claimed is:

1. A process for the preparation of crosslinked unsaturated polymers, which comprises reacting a mixture, containing substantially stoichiometric amounts of a di-isocyanate or polyisocyanate and of a polyol, with a monomeric or oligomeric β-aminocrotonic acid ester or β-aminocrotononitrile or β-aminocrotonamide, the ratio of the isocyanate component to the β-aminocrotonic acid derivative component being chosen so as to provide not less than one isocyanate group per molecular group of the formula

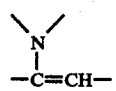

of the particular β-aminocrotonic acid derivative.

2. A process according to claim 1, wherein 1 to 2 isocyanate groups are provided per molecular group of the formula

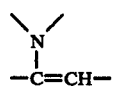

of the particular β-aminocrotonic acid derivative.

3. A process according to claim 1, wherein a β-aminocrotonic acid ester of one of the formulae I to III

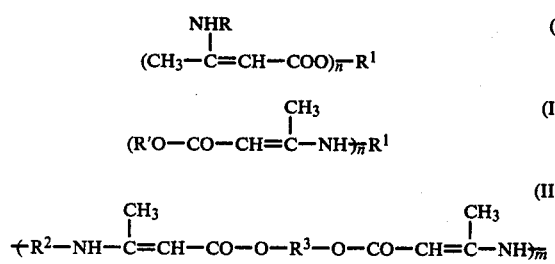

in which R is a hydrogen atom or a saturated or unsaturated linear, branched or cyclic hydrocarbon radical having 1 to 9 C atoms, R' is a saturated or unsaturated, linear, branched or cyclic hydrocarbon radical having 1 to 9 carbon atoms, n is one of the numbers 2, 3 or 4 and m is a number from 4 to 15 and $R^1$ is an n-valent, and $R^2$ and $R^3$ are each a divalent, linear, branched or cyclic hydrocarbon radical which can contain ether bridges or COO groups and has 2 to 20 C atoms, or a divalent heterocyclic ring containing N, O or S atoms, $R^2$ and $R^3$ being identical or different, is employed.

4. A process according to claim 3, wherein a β-aminocrotonic acid ester of one of the formulae I to III, in which R is hydrogen, R' is $C_1$-$C_4$-alkyl or $C_2$-$C_4$-alkenyl and $R^2$ and $R^3$ are each a divalent alkylene radical having 2-9 C atoms, is employed.

5. A process according to claim 3, wherein a β-aminocrotonic acid ester of the formula I, in which n is the number 2 and $R^1$ is a divalent aliphatic radical, which can contain ether bridges or COO groups, is employed.

6. A process according to claim 5, wherein a β-aminocrotonic acid ester of the formula I, in which n is the number 2 and $R^1$ is hexamethylene or 2,2-dimethylpropylene, is employed.

7. A process according to claim 1, wherein a β-aminocrotononitrile of one of the formulae IV to VI

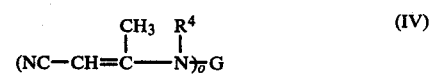

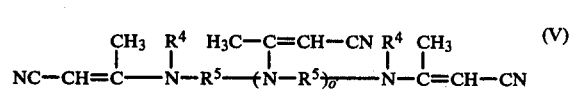

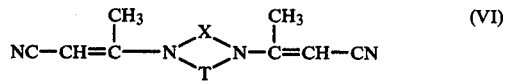

in which $R^4$ is a hydrogen atom, alkyl having 1 to 6 C atoms, cycloalkyl having 5 or 6 C atoms or aryl having 6 to 10 C atoms, o' is one of the numbers 1, 2 or 3, o is one of the numbers 2 or 3, G is an o-valent organic radical having 2 to 30 C atoms and $R^4$ is a divalent aromatic or aliphatic radical having up to 30 C atoms, and X and T are organic radicals which, together with the two N atoms, form a 5-membered or 6-membered heterocyclic ring, is employed.

8. A process according to claim 7, wherein a β-aminocrotononitrile of one of the formula IV to VI, in which $R^4$ is hydrogen and $R^5$ is a divalent alkylene radical having 2-6 C atoms, and X and T form a piperazine ring with the two N atoms, is employed.

9. A process according to claim 1, wherein a β-aminocrotonamide of one of the formulae VII to IX

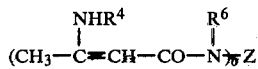 (VII)

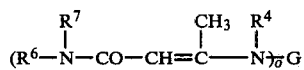 (VIII)

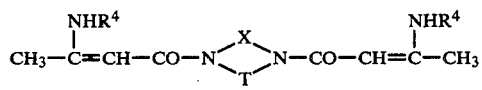 (IX)

in which $R^4$, $R^6$ and $R^7$, independently of one another, are hydrogen, alkyl having 1 to 6 C atoms, cycloalkyl having 5 or 6 C atoms or aryl having 6 to 10 C atoms, o is 2 or 3 and G and Z, independently of one another, are an o-valent organic radical having 2 to 30 C atoms, and X and T are organic radicals which, together with the two N atoms, form a 5-membered or 6-membered heterocyclic ring, is employed.

10. A process according to clam 9, wherein a β-aminocrotonamide of one of the formulae VII to IX, in which $R^4$ and $R^6$ are hydrogen, $R^7$ is $C_1$–$C_4$-alkyl, G is 4,4'-diphenylmethane or hexamethylene and X and T form a piperazine ring with the two N atoms, is employed.

11. A process according to claim 9, wherein a β-aminocrotonamide of the formula VII, in which $R^4$ and $R^6$ are each hydrogen, o is the number 2 and Z is a divalent aliphatic radical, is employed.

12. A process according to claim 11, wherein Z is 2,2,5-trimethylhexamethylene.

13. A process according to claim 1, wherein isophorone diisocyanate, trimerised hexamethylene diisocyanate, di-phenylmethane 4,4'-diisocyanate or toluylene diisocyanate is employed.

14. A process according to claim 1, wherein the polyol employed is a branched polyether-polyol having a hydroxyl equivalent weight of 105 or 150.

* * * * *